(12) United States Patent
Conrad

(10) Patent No.: US 7,270,065 B2
(45) Date of Patent: Sep. 18, 2007

(54) ELECTRONIC PULSING OF CHEMICAL WITH SEED

(75) Inventor: Larry Conrad, Delta, IA (US)

(73) Assignee: AMVAC Chemical Corporation, Newport Beach, CA (US)

( * ) Notice: Subject to any disclaimer, the term of this patent is extended or adjusted under 35 U.S.C. 154(b) by 0 days.

(21) Appl. No.: 11/359,413

(22) Filed: Feb. 23, 2006

(65) Prior Publication Data

US 2007/0193483 A1 Aug. 23, 2007

(51) Int. Cl.
*A01C 5/00* (2006.01)

(52) U.S. Cl. .................. 111/200; 111/900; 111/903

(58) Field of Classification Search ............. 111/200, 111/900, 903, 904, 170, 174, 177–185
See application file for complete search history.

(56) References Cited

U.S. PATENT DOCUMENTS

| | | | |
|---|---|---|---|
| 5,301,848 A | 4/1994 | Conrad et al. | |
| 5,524,794 A | 6/1996 | Beneditti, Jr. et al. | |
| 5,539,669 A | 7/1996 | Goeckner et al. | |
| 5,638,285 A | 6/1997 | Newton | |
| 5,641,011 A | 6/1997 | Beneditti, Jr. et al. | |
| 5,687,782 A | 11/1997 | Cleveland et al. | |
| 5,737,221 A * | 4/1998 | Newton | 701/50 |
| 6,938,564 B2 | 9/2005 | Conrad et al. | |
| 2004/0231575 A1* | 11/2004 | Wilkerson et al. | 111/127 |

FOREIGN PATENT DOCUMENTS

WO    WO 00/24241    5/2000

* cited by examiner

*Primary Examiner*—Christopher J. Novosad
(74) *Attorney, Agent, or Firm*—McDermott Will & Emery LLP

(57) ABSTRACT

A system and method for electronically pulsing chemical with seed. The system and method incorporate a seed dispensing tube configured to dispense seeds, a granule tube configured to dispense chemical, an electrical valve configured to open so that chemical granules may be dispensed from the chemical granule tube, and a proximity sensor operably coupled to the electrical valve, the sensor being configured to sense a seed dispensed from the seed dispensing tube. The system may also include a metering mechanism for metering the quantity of chemical that is dispensed with the seed. The metering mechanism may be controlled by a radar unit on a tractor associated with the system, and the metering mechanism may be programmed to dispense a predetermined quantity of chemical with the seed.

17 Claims, 6 Drawing Sheets

ELECTRONIC PULSING OF CHEMICAL WITH SEED

BACKGROUND

1. Field

The present disclosure relates to dispensing seeds and insecticides and, more particularly, to electronically releasing chemical granules in close proximity to a dispensed seed by sensing the passage of a seed through a tube and releasing a chemical granule.

2. Description of Related Art

Planting and chemical granular dispensing systems for dispensing seed and insecticides, herbicides, fungicides or fertilizers, have made the handling of seed and chemical granules less hazardous to the agricultural worker by providing a closed container system, such as those described in U.S. Pat. No. 5,301,848 and U.S. Pat. No. 4,971,255, incorporated by reference herein and the SmartBox® System marketed by AMVAC Chemical Corporation. Briefly, as described in U.S. Pat. No. 5,301,848, access to and from a container in a closed container system is available through a single opening in the bottom wall of the container, offering distinct advantages over an open-top, non-removable container design in an open container system.

Closed container systems provide a removable container which is pre-filled with the chemical granules of toxic materials such as insecticides, fertilizers, herbicides and other pesticides, thereby eliminating the need to open and pour bags of chemical granules into storage hoppers. Since the closed container system is largely not open to the air, agricultural workers have less opportunity to come into contact with the chemical granules, thereby reducing skin and inhalation exposure to the hazardous chemicals.

While closed container systems reduce the risk of chemical exposure to agricultural works and others and still dispense the insecticides, pesticides, herbicides or fertilizers based on a desired rate, the amount of chemical granules dispensed is often still greater than what is needed to provide a desired effect. For instance, U.S. Pat. No. 5,271,343 describes a planter system in which chemical granules are dispensed along the entire length of the seed furrow, or trench. In this situation, much of the dispensed chemical granules in the seed furrow are not effectively used due to the distance from the planted seed, reducing overall efficiency.

Research has indicated that it is inefficient to use the conventional method of dispensing chemical granules, in which chemical granules are dispersed over an entire length of the seed furrow in which seed is planted. Instead, dispensing smaller amounts of the chemical granules of insecticides and other pesticides in close proximity to the seed not only obtains the desired effect of eliminating insects or pests, but also reduces the amount of chemical agent that is used to obtain such an effect. As such, the result is more cost effective, environmentally friendly, and less hazardous, while maintaining the desired effect of the chemical granules.

There is a need for a chemical dispensation that more closely regulates the amount of chemical dispensed with the seed.

There is further a need for a chemical dispensation system that dispenses the chemical in closer proximity with the seed.

BRIEF SUMMARY

The present disclosure addresses the foregoing deficiencies of the prior art by providing a method and system to increase the effectiveness of soil-applied chemicals at planting by delivering the chemical granules and a seed in close proximity with each other.

In accordance with one embodiment of the present disclosure, a system is provided for electronically pulsing chemical with seed. The system comprises a chemical granule tube configured to dispense chemical granules. The system further comprises a proximity sensor configured to sense the dispensation of a seed. The system also comprises an electrical pulsing valve operably coupled to both the chemical granule tube and the proximity sensor, the valve being configured to open so that chemical granules may be dispensed from the chemical granule tube upon detection of the presence of a seed by the proximity sensor.

In accordance with another embodiment of the present disclosure, a system is provided for electronically pulsing chemical with seed. The system comprises a chemical granule tube configured to dispense chemical granules, and a proximity sensor configured to sense the dispensation of a seed. The system further comprises an electrical pulsing valve operably coupled to both the chemical granule tube and the proximity sensor, the valve being configured to open so that chemical granules may be dispensed from the chemical granule tube upon detection of the presence of a seed by the proximity sensor. The system also comprises a chemical granule metering system configured to distribute a particular quantity of chemical granules with the seeds, according to the ground speed of a vehicle incorporating the system, wherein the ground speed is detected by a speed sensing unit on the vehicle.

In accordance with yet another embodiment of the present disclosure a method is provided for electronically pulsing chemical with the seed. The method comprises dispensing at least one seed through a seed dispensing tube, sensing the presence of the at least one seed as it exits the seed dispensing tube. The method further comprises electronically pulsing chemical granules when the seed's presence is detected.

These, as well as other objects, features and benefits will now become clear from a review of the following detailed description of illustrative embodiments and the accompanying drawings.

DETAILED DESCRIPTION OF ILLUSTRATIVE EMBODIMENTS

The present disclosure is directed to an electronically controlled seed and chemical dispensing system that includes a seed hopper configured to store seeds, a seed dispensing tube configured to dispense seeds; a seed sensing device, e.g., a proximity sensor, coupled to the seed to detect the presence of a seed; and an electronic pulsing valve configured to pulse chemical when the presence of seed is detected.

Figure 1:
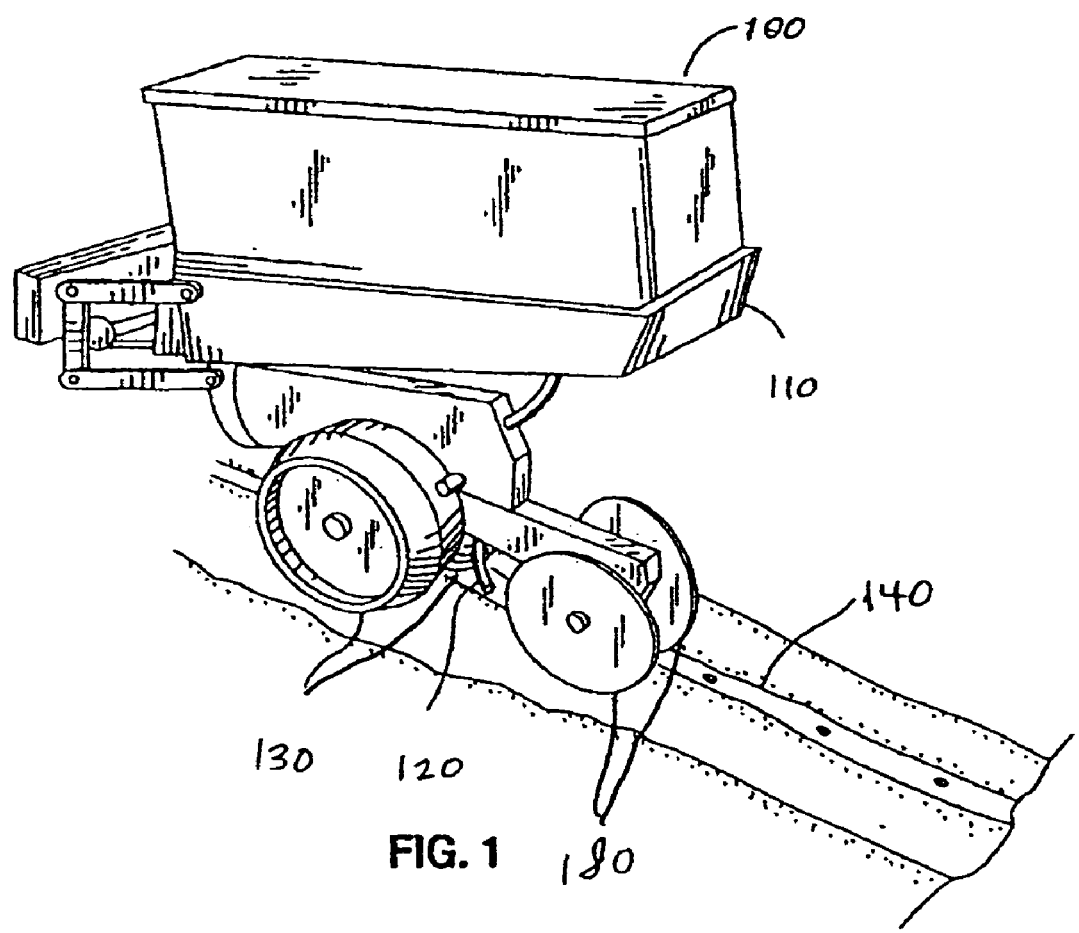
FIG. 1 is a perspective view of a seed and chemical granule dispensing tube system in accordance with one embodiment of the present disclosure.

FIG. 1 is a perspective view of a seed and chemical granule dispensing tube system in accordance with one embodiment of the present disclosure. Specifically, system 100 includes a seed compartment and a granule storage compartment for holding insecticide or other pesticides. System 100 may be disposed on top of planter unit 110, and may be removable from planter unit 110. As such, system 100 can be returned to the seed and insecticide distributor for refilling.

Planter unit 110 may follow behind a seed trenching unit (not shown) or may include a seed trenching unit (not shown). In either case, a seed furrow A is trenched in the soil. As will be discussed below in more detail, the seed and the chemical granules may be passed through a seed dispensing tube of planter unit 110, which includes an output such as seed dispensing tube 120 immediately before depth control wheels 130. Depth control wheels 130 may control the seed trench depth. Closing wheels 180 turn the soil to cover the seed furrow 140.

Figure 2:
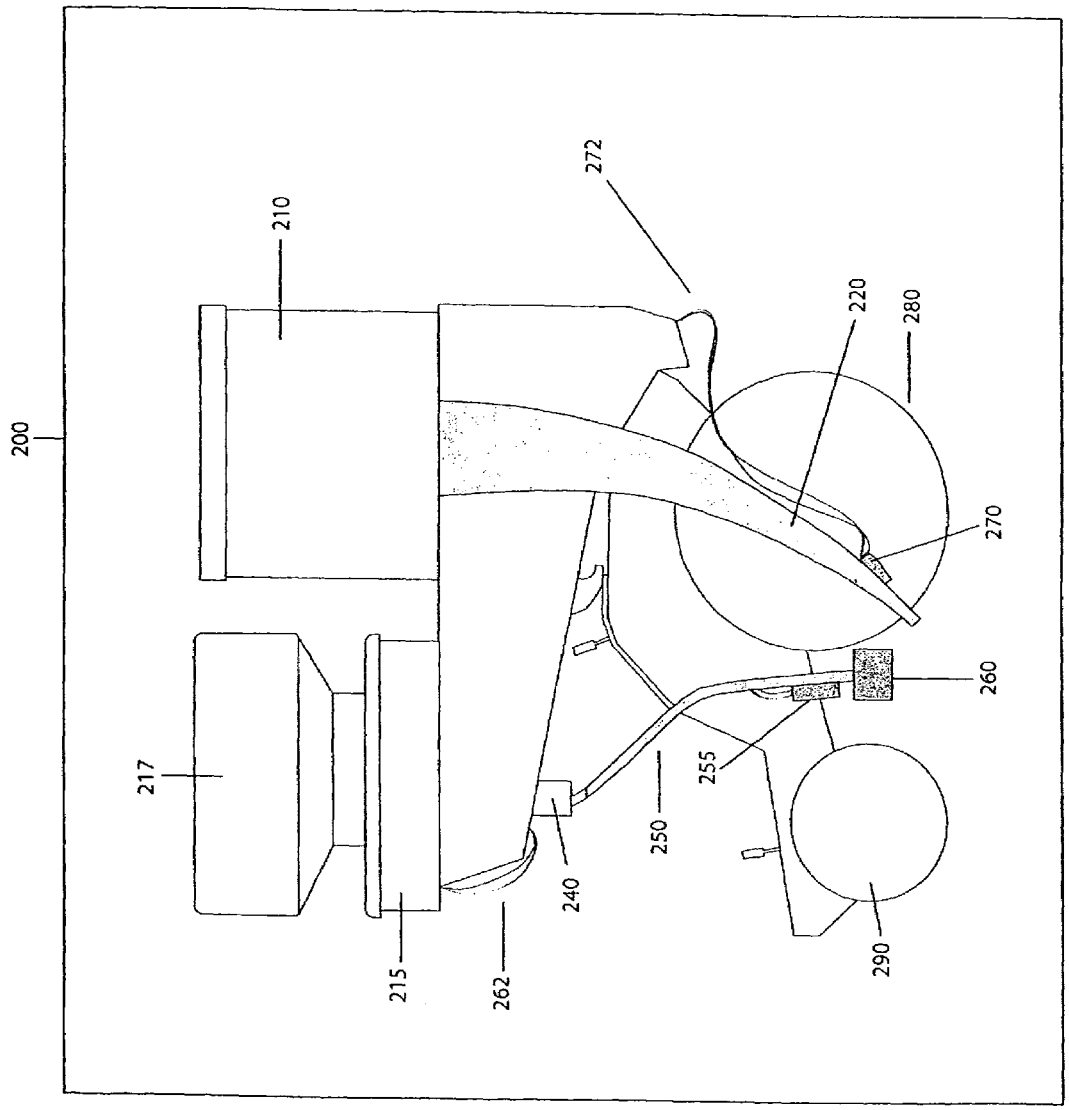
FIG. 2 is a schematic view of the seed and chemical granule dispensing tube system in accordance with one embodiment of the present disclosure.

Referring now to FIG. 2, illustrated is a schematic view of the seed and chemical granule dispensing tube system in accordance with one embodiment of the present invention. Although FIG. 2 shows one such system 200, it should be understood that typical planters includes multiple systems, e.g., twenty-four (24) of such systems. As shown in FIG. 2, the system 200 includes seed hopper 210 and granule storage hopper 215. At the bottom of seed hopper 210 may be a seed dispensing tube 220 into which seeds may be dispatched from seed hopper 210 in a metered fashion.

More specifically, a meter may be built into the bottom of seed hopper 210 that turns to dispense seed. The manner in which the seed may be metered or dispensed is similar to the method disclosed in U.S. Pat. No. 5,301,848, which is incorporated herein by reference. Alternatively, a gate or door may be used in the meter's stead to electronically open and close to allow a single seed to be deposited in a seed furrow.

Granule storage hopper 215 has a discharge opening (not shown) which is connected to chemical tube 250. Granule storage hopper 215 includes a pulsing electrical valve 260 and/or a gate or door which opens or closes in order to permit the flow of chemical granules. It may be desirable for the pulsing electrical valve to be as close to the seed discharge opening as possible so the chemical pulses will not have time to lose their integrity and break down into a continuous stream. In order for the pulsing electrical vale to be small enough to fit into the area of the seed tube discharge area, a meter design such as in the U.S. Pat. No. 5,156,372 will have to be used. Furrow opening wheel 280 may be mounted between depth control wheels, and may be used to open a furrow into which the seeds and chemical granules are dispensed. Furrow closing wheel 290 may be used to close a furrow into which the seeds and chemical granules are dispensed.

Chemical granules may held within chemical tube 250 and may not be dispensed until a seed drops through seed dispensing tube 220. A seed sensing device, e.g., proximity sensor 270, may sense the presence of a seed being dispensed through the seed dispensing tube 120. Proximity sensor 270 may be disposed on the exterior of seed dispensing tube 120 as shown. Alternatively, proximity sensor may be disposed within seed dispensing tube, or within in any location along the longitude or cross-section or elsewhere in the seed and chemical granule dispensing system where it may sense the presence of a seed that has been dispensed from the seed dispensing tube for the purpose of timing a dispensation of chemical granules.

When the proximity sensor 270 senses the presence of a seed in the seed dispensing tube, it may send a signal via an electrical connection 272 to one or more control units which may reside in the cab of a tractor that pushes or pulls the system 200 for dispensing chemical with seed. The one or more control units may then send a signal to the electrical valve 260 via an electrical connection between the one or more control units and the electrical valve 260.

The granule storage hopper 215 may include a "Smart Box" mechanism that automatically adjusts the quantity of chemical granules that are dispensed along with the seeds, taking into account changes in speed of the planting. A subcontroller 255 may be used to adjust the quantity of chemical granules that are dispensed along with the seed. The "Smart Box" subcontroller 255 may be operably coupled via an electrical connection to the radar of the vehicle or tractor that is used to move the system 200 around a field in which seeds and chemicals are to be dispensed. The "Smart Box" mechanism is generally described in U.S. Pat. No. 5,737,221, which is incorporated by reference herein.

The Smart Box mechanism may be used to accomplish a desired chemical granule dispensing rate, taking into account both the ground speed of the vehicle used to dispense the chemical granules and calibration data associated with the metering of the granule hopper 215. After the proximity sensor 270 senses the presence of a seed, the Smart Box metering mechanism 217 may control the amount of chemical granule that is dispensed with each seed. For example, the metering mechanism 217 could be controlled to allow for a certain number of milligrams of chemical per seed. Alternatively, the metering mechanism may be configured to permit a specified quantity in terms of pounds per acre of chemical granules to be dispensed along with the seed. The electronic pulsing valve 260 determines when this amount should be dispensed.

Figure 3:
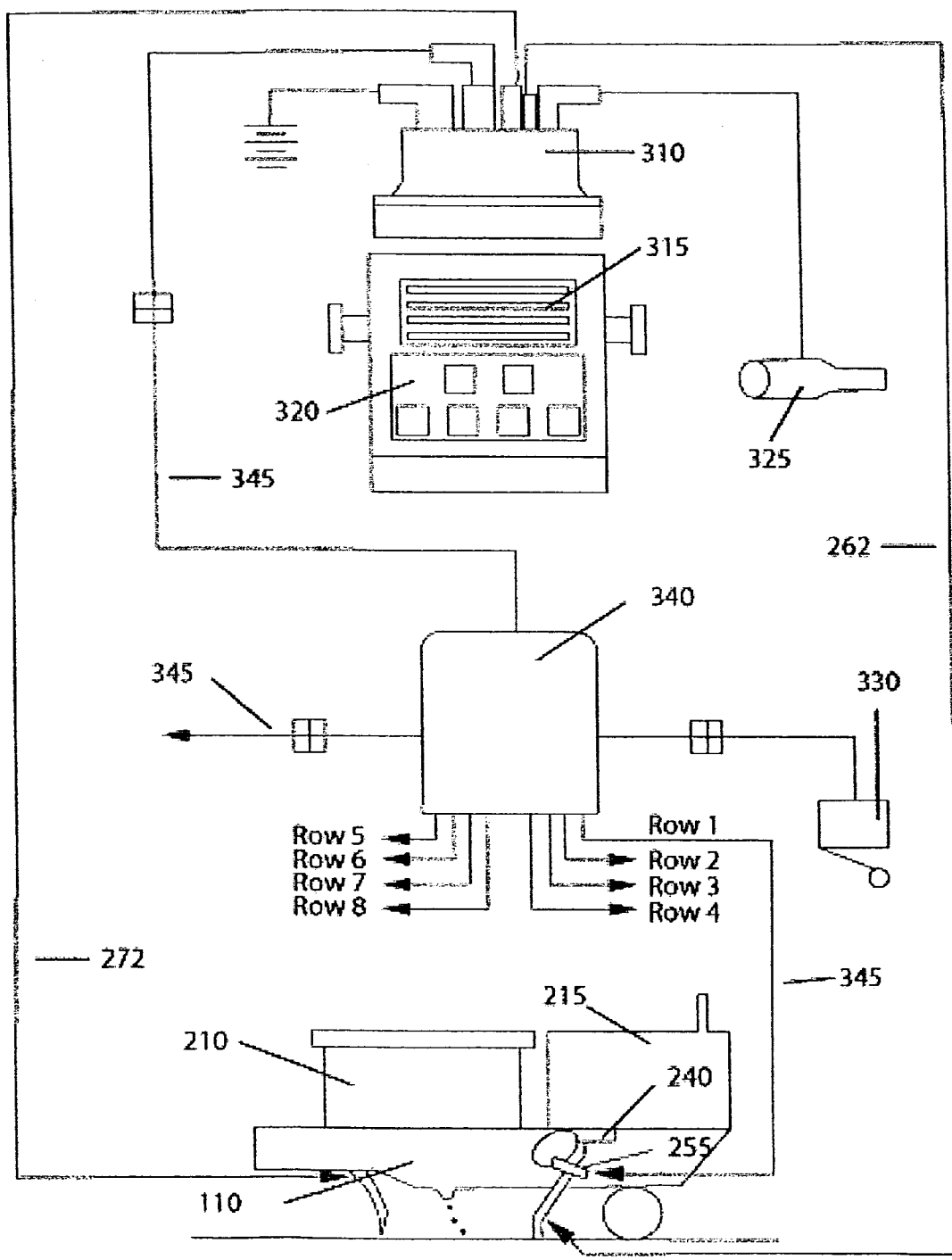
FIG. 3 is a distributed control system that includes main microcontroller unit having a display and keypad for operator interface.

Referring now to FIG. 3, the Smart Box mechanism may be incorporated within a distributed control system that includes a main unit 310 such as a microcontroller having a display 315 and keypad 320 for operator interface. A speed sensing unit, e.g., radar 325, may be connected to the main control unit 310 to provide ground speed. Ground speed may be used to modify the material dispensing rate to account for the planter's speed. The main control unit 310 may be connected to a junction box 340 by a high speed serial communications link 345. The main control unit 310 may be in constant communication through the serial communications link 345 to a subcontroller 255 located on a planter such as that shown in FIG. 2.

The subcontrollers on the planters may allow a method of multiplexing signals going to the main control unit 310. The main control unit 310 may control a 24-row planter with only nine wires going to a junction box 340. One pair of wires may be used for serial communications, three pairs of wires may be used to power the subcontroller 255 and metering device 240. One wire may be provided for the lift switch 330. Three pairs of wires may be used to more evenly distribute the current requirements.

The main control unit 310 may also contain a non-volatile memory unit, typically known as "flash" memory. Information pertaining to the usage and application of pesticides is stored in this nonvolatile memory unit.

The junction box 340 may be connected by additional portions of the serial communications link 345 to a plurality of subcontroller units. Each subcontroller unit 255 may be associated with one row of the planter. The junction box 340 may connect up to eight row control units to the main control unit 310. If the planter has more than eight rows, additional junction boxes may be connected in series to the first junction box 340. A lift switch 330 may be connected to the first junction box 340. The lift switch 330 may indicate when the planter is not in an operating position. Other interfaces to the main control unit 310 may be provided such as serial or parallel links for transmitting information to other computer systems or printers. As shown, the proximity sensor communication link 272 and valve communication link 262 are also interfaced with main control unit 310.

The subcontroller 255 may have memory devices and logic devices within to modify and implement the commands from the main controller control unit 310. The subcontroller 255 may read information from a container memory circuit attached to the granule storage hopper 215 and manipulate the commands from the main control unit 310 to properly operate the metering device 240. For example, if the concentration of pesticide on a first row is different from the concentration of pesticide on a second row, the subcontroller 255 can modify the commands of the main controller 310 to properly dispense pesticides from all rows. The subcontroller 255 may also read metering device 240 calibration data from the container memory circuit and modify the main control unit 310 commands to account for differences in performance of different metering devices.

The subcontroller 255 may allow the operator of the cab to completely change the programmed functions of the main control unit 310. For example, if a pre-programmed subcontroller 255 were placed on a liquid herbicide sprayer, the main control unit 310 might be able to read the dispenser type information and operate as a liquid sprayer controller.

In the illustrated figures, one subcontroller is used to control one metering device 240 and memory unit. It should be understood, however, that a subcontroller 255 may control multiple devices, for example, two metering device devices 240 and memory units or one metering device 240 and memory unit and one seed hopper and seed planting mechanism.

Figure 4A:
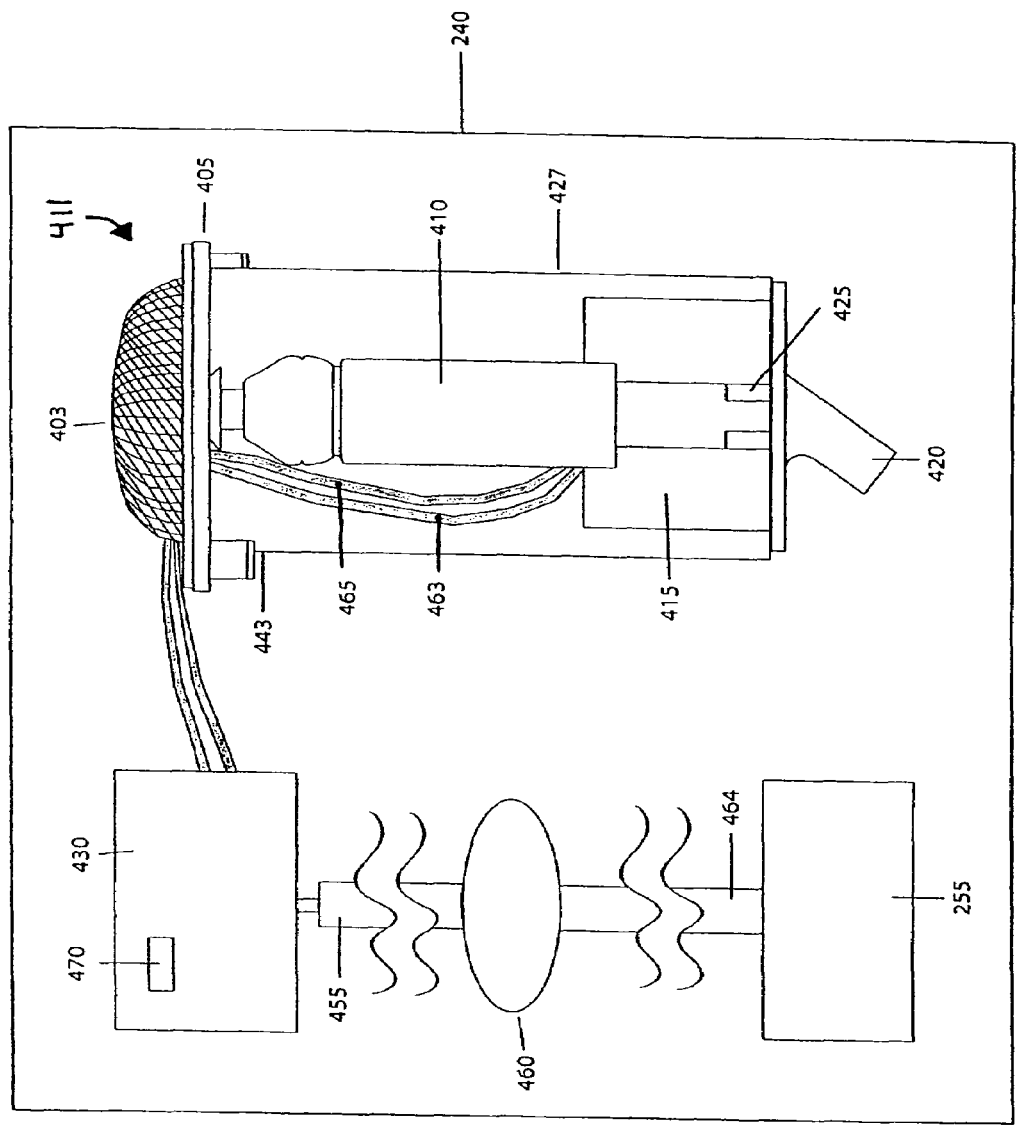
FIGS. 4A-4C illustrate the metering device and memory unit shown in FIG. 2.
Figure 4B:
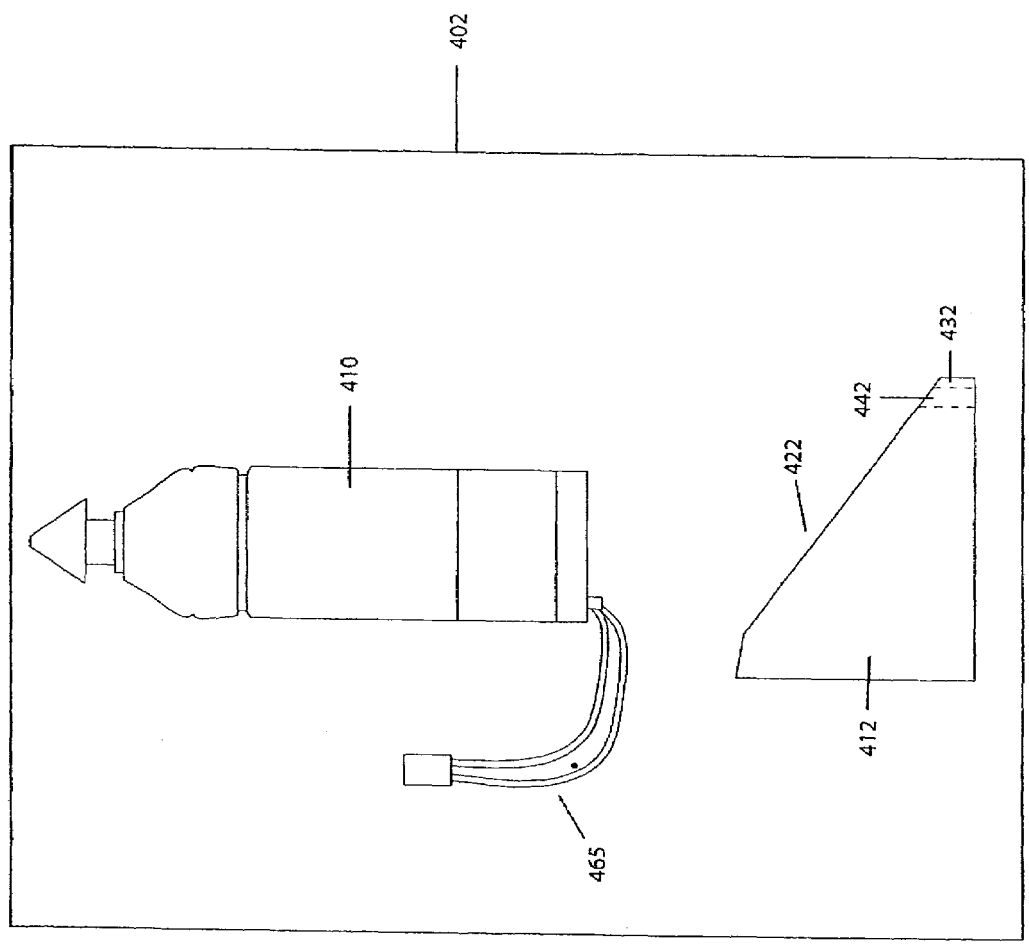
Figure 4C:
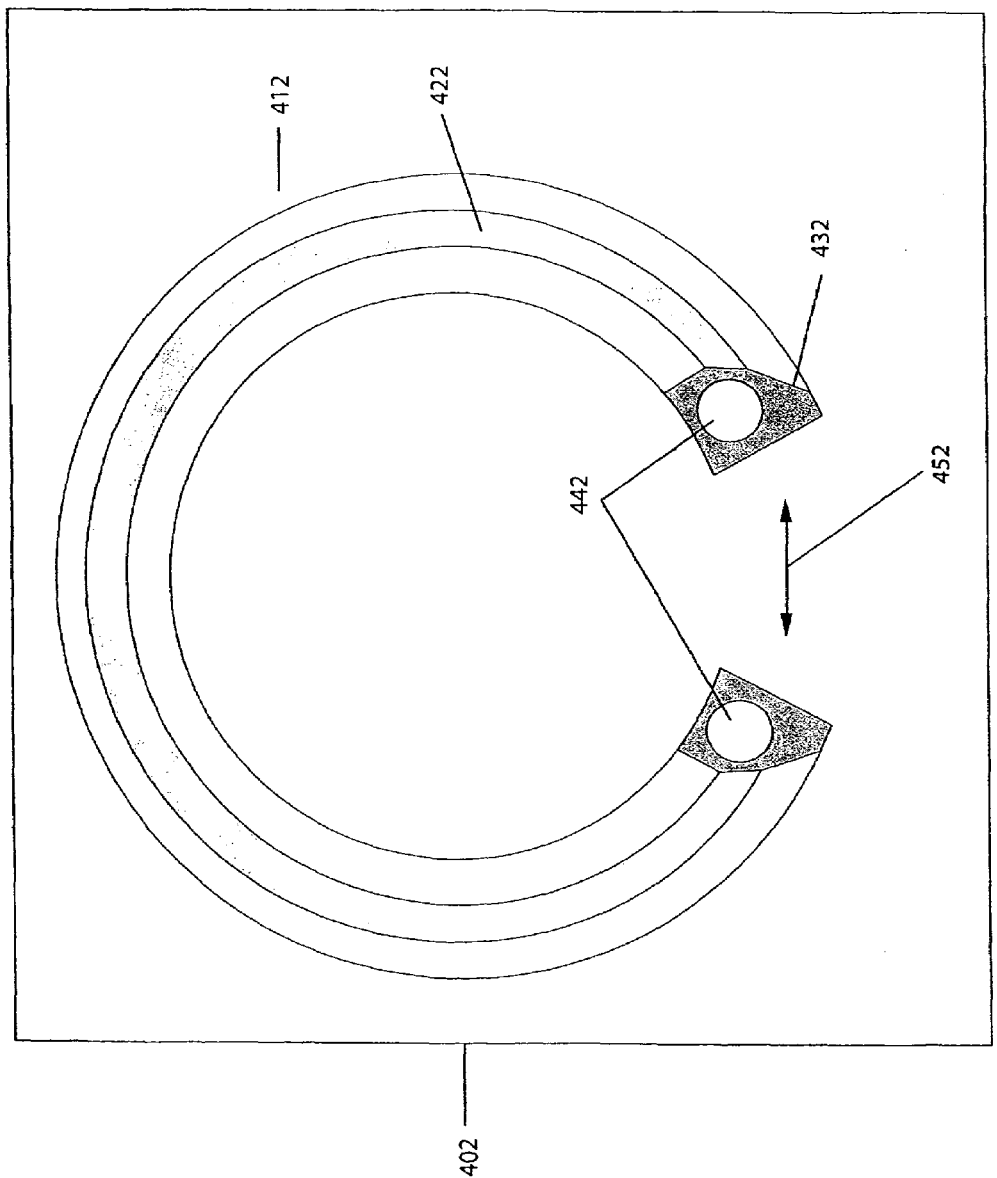

Referring now to FIGS. 4A-4C, illustrated is the metering device 240 and memory unit shown in FIG. 2. The metering apparatus 411, for use with a pesticide container, includes a top orifice plate 405 that may be fastened to the bottom of a pesticide container. Just above the top orifice plate 405 may be disposed a screen 403 for screening granular materials to be passed through the metering apparatus 411. Disposed through top orifice plate 410 may be an inlet aperture that permits the introduction of chemical granules from the pesticide container into the metering apparatus 411.

The metering apparatus 411 may be electromechanical and may be attached to the top orifice plate 405. The metering apparatus 411 may incorporate an electric solenoid 410. The solenoid 410 may be in contact with a flow sensor 415 or other sensing unit which is, in turn, coupled to outlet aperture 420.

Outlet aperture 420 may include, disposed therein, a calibrated orifice 425. The maximum flow rating for specified chemicals will be known, and the flow rating through the calibrated orifice 425 may reflect the maximum flow rating for such materials. When the metering apparatus 411 has material entering its top orifice plate 405 faster than the maximum flow rating for a particular material, the material tends to back up at the outlet aperture 420 and/or calibrated orifice 425 and set off the flow sensor 415.

By using the controller rate adjustment, the operator may increase the flow rate of the material through the metering apparatus 411 until the flow sensor 415 signals the controller that the material has built up on the flow sensor orifice. The operator than compares the flow rate from the controller to the maximum flow rate for the orifice. The controller calibration mode may list the calibration number for each meter. The operator may then adjust the calibration number for the metering apparatus 411 so the controller flow rate agrees with the orifice flow rate. The adjustment may also be done manually in ways known to an ordinary skilled artisan. If the memory in the controller for the metering apparatus 411 is sufficiently large, the controller may be able to check calibration during the planting process, i.e., the process of depositing seed into the furrow.

Operator access to the calibrated orifice 425 may be desired. In this connection, the bottom of the metering apparatus 411 may have a connector on the flow sensor 415 removed. The connector may be bolted over the flow sensor 415 with four mounting bolts. The calibrated orifice 425 may be disposed on top of the connector and may be changed easily by removing the four bolts.

The meter screen 403 should be as small as possible to prevent plugging of the calibrated orifice 425.

The solenoid 410 may be energized by a subcontroller 255 operably coupled to the metering apparatus 411 to allow pesticide to flow by gravity from the pesticide container that may be disposed above the metering apparatus 411 or any other desired location that would permit the metering apparatus 411 to be calibrated in accordance with the present disclosure. The solenoid may be electrically connected to a motherboard 443 which is, in turn, connected to an electronic memory circuit 430.

It may be desirable to seal the solenoid 410 from the pesticide or other chemical granules that may be introduced into the metering apparatus. Pesticide entering the solenoid 410 could cause premature failure of the solenoid 410. The solenoid 410 may be sealed by a cover (not shown) to prevent entry of pesticide or other chemical granules into the solenoid 410.

An electronic memory circuit 430 may be connected to the motherboard. A multi-conductor cable 455, connector 460 and cable or connector 464 may be used to connect the electronic memory circuit 430 to a subcontroller 255 for the solenoid and/or metering apparatus 411. In accordance with one embodiment of the present disclosure, the subcontroller 255 may directly apply electrical power to the solenoid 410 through power wires 465. In addition to connecting the subcontroller solenoid power to the solenoid 410, the electronic memory circuit 430 may also include a non-volatile memory device 470. The memory device 470 may be an E PROM, a non-volatile memory device that is electrically erasable programmable memory, also referred to as EEPROM or E.sup.2 PROM. The flow sensor 415 may also be electrically connected to the motherboard 443 via wire 463.

The combination of the electronic memory 470 and the pesticide container with attached metering device 410 may create a material container capable of electronically remembering and storing data important to the container, the material dispensing system, and the pesticide. Among the data which could be stored are: a serial number unique to that container, pesticide lot number, type of pesticide, metering calibration, date of filling, quantity of material in the container, quantity of material dispensed including specific rates of application, fields treated. This stored data can be recalled and updated as needed. The stored data can also be used by a metering controller or pumping system by accessing specific calibration numbers unique to the container and make needed adjustments, by sounding alarms when reaching certain volume of pesticide in a container, or keeping track of usage of the container to allow scheduling of maintenance.

The metering apparatus 411 may also include an in-meter diffuser configured to be wrapped around solenoid 410 within meter housing 427.

Referring now to FIG. 4B, illustrated is an in-meter diffuser 402 in accordance with one embodiment of the present disclosure. The in-meter diffuser 402 includes a main body 412 having sloped sides 422, a level bottom 432 and orifices 442. The sloped sides 422 may be cut to about a 45 degree angle. The level bottom 432 may have orifices configured to surround the solenoid of a metering apparatus. During operation, the chemical granules or other material flow down the main body 412 of the diffuser 402 and out of orifices 442. Foreign material and lumps may pass over the metering holes and into an overflow space.

Referring now to FIG. 4C, illustrated is a top view of the in-meter diffuser 102 shown in FIG. 4B. As illustrated, the main body 412 includes two orifices 442 for receiving chemical granules. The in-meter diffuser 402 also includes an overflow space 452. Overflow space 452 is used to capture high rate flow, lumps and foreign material.

While the specification describes particular embodiments of the present invention, those of ordinary skill can devise variations of the present invention without departing from the inventive concept.

We claim:

1. A system for electronically pulsing chemical with seed, comprising:
   a chemical granule tube configured to dispense chemical granules from an opening thereof;
   a seed sensing device configured to sense a dispensation of a seed;
   a chemical granule metering system operably coupled to the chemical granule tube and configured to dispense a particular quantity of chemical granules with the seed; and
   an electrical pulsing valve operably coupled to both the chemical granule tube and the seed sensing device and disposed between the opening of the chemical granule tube and the chemical granule metering system, the valve being configured to open to dispense chemical granules from the opening of the chemical granule tube when the seed sensing device senses the dispensation of the seed.

2. The system of claim 1,
   wherein the particular quantity corresponds to a ground speed of a vehicle incorporating the system.

3. The system of claim 2, wherein the ground speed of the vehicle is detected by a speed sensing unit on the vehicle.

4. The system of claim 1, further comprising:
   a seed dispensing tube configured to dispense the seed,
   wherein the seed sensing device is coupled to the seed dispensing tube, and the seed sensing device is configured to sense the dispensation of the seed from the seed dispensing tube.

5. The system of claim 4, further comprising:
   a seed storage hopper coupled to the seed dispensing tube, the seed storage hopper being configured to store the seed.

6. The system of claim 1, further comprising:
   a granule storage hopper coupled to the chemical granule tube, the granule storage hopper being configured to store the chemical granules.

7. The system of claim 1, wherein the chemical granule metering system is configured to dispense chemical granules at a constant application rate regardless of a speed of a vehicle incorporating the system.

8. A system for electronically pulsing chemical with seed, comprising:
   a chemical granule tube configured to dispense chemical granules from an opening thereof;
   a seed sensing device configured to sense a dispensation of a seed;
   a chemical granule metering system operably coupled to the chemical granule tube and configured to dispense a particular quantity of chemical granules with the seed; and
   an electrical pulsing valve operably coupled to both the chemical granule tube and the seed sensing device and disposed between the opening of the chemical granule tube and the chemical granule metering system, the valve being configured to open to dispense chemical granules from the opening of the chemical granule tube when the seed sensing device senses the dispensation of the seed,
   wherein the particular quantity corresponds to a ground speed of a vehicle incorporating the system, and wherein the ground speed is detected by a speed sensing unit on the vehicle.

9. The system of claim 8, further comprising:
   a seed dispensing tube configured to dispense the seed,
   wherein the seed sensing device is coupled to the seed dispensing tube, and the seed sensing device is configured to sense the dispensation of the seed from the seed dispensing tube.

10. The system of claim 9, further comprising:
    a seed storage hopper coupled to the seed dispensing tube, the seed storage hopper being configured to store the seed.

11. The system of claim 8, further comprising:
    a granule storage hopper coupled to the chemical granule tube, the granule storage hopper being configured to store the chemical granules.

12. A method for electronically pulsing chemical with seed, comprising the steps of:
    dispensing at least one seed through a seed dispensing tube;
    sensing the at least one seed as it exits the seed dispensing tube; and
    when the seed is detected, electronically pulsing an electrical pulsing valve to dispense chemical granules, wherein the electrical pulsing valve operably coupled to a chemical granule tube and disposed between an opening of the chemical granule tube and a chemical granule metering system configured to dispense a particular quantity of chemical the granules with the at least one seed.

13. The method of claim 12, wherein the chemical granules are dispensed via a granule tube from a granule storage hopper.

14. The method of claim 12, wherein the at least one seed is dispensed through the seed dispensing tube from a seed hopper.

15. The method of claim 12, wherein the particular quantity corresponds to a ground speed of a planting vehicle.

16. The method of claim 12, wherein a seed sensing device is coupled to the seed dispensing tube, and the seed sensing device is configured to sense the at least one seed as it exits the seed dispensing tube.

17. The method of claim 12, wherein the chemical granule metering system is configured to dispense chemical granules at a constant application rate regardless of a speed of a vehicle incorporating the system.

* * * * *

UNITED STATES PATENT AND TRADEMARK OFFICE
CERTIFICATE OF CORRECTION

PATENT NO. : 7,270,065 B2 Page 1 of 1
APPLICATION NO. : 11/359413
DATED : September 18, 2007
INVENTOR(S) : Larry Conrad It is certified that error appears in the above-identified patent and that said Letters Patent is hereby corrected as shown below:

Column 5, line 18, "main controller control" should read -- main control --.

Column 5, beginning on line 40 and ending on line 41, "metering device devices" should read -- metering devices --.

Claim 12, column 8, line 60 "chemical the granules" should read -- the chemical granules --.

Signed and Sealed this

Third Day of June, 2008

JON W. DUDAS
*Director of the United States Patent and Trademark Office*